UNITED STATES PATENT OFFICE 2,674,579

MIXED ARYLOXY ARYL SILANES

Clarence R. Morgan, Marblehead, and Walter F. Olds, Boston, Mass., assignors, by mesne assignments, to California Research Corporation, San Francisco, Calif., a corporation of Delaware No Drawing. Application January 3, 1950, Serial No. 136,649

8 Claims. (Cl. 252—78)

This invention relates to the mixed aryloxy aryl silanes.

In the use of liquids as heat transfer media it is desirable that the liquids resist decomposition when subjected to high temperatures and that such liquids remain liquid at or below room temperatures, that is, that their melting points be low. The aryl orthosilicates have been proposed as liquids meeting these requirements. However in many uses liquids are desirable that are more resistant to thermal decomposition at higher temperatures than these orthosilicates. We have found that the mixed aryloxy aryl silanes, which to the best of our knowledge are heretofore unknown, are extremely resistant to high temperatures and remain liquid at temperatures below room temperature and therefore meet the requirements for the uses listed above.

It is therefore an object of our invention to provide novel liquids, the mixed aryloxy aryl silanes, having exceptional high temperature characteristics with low melting points which make these liquids well suited for uses as heat transfer media.

The extreme thermal stability of tetraphenyl silane $(C_6H_5)_4Si$, which is a high melting solid distilling above 950° F. without decomposition, is known. Diphenyldiphenoxy silane $$(C_6H_5)_2Si(OC_6H_5)_2$$

a solid melting at 70–71° C. is also known. The mixed aryloxy phenyl compositions corresponding to this solid have not been known heretofore and we have found that when aryl esters are combined with phenyl groups directly attached to silicon, very stable high temperature liquids result which are liquid below room temperatures and which may be generically defined as mixed di-aryloxy di-phenyl silanes.

One such novel mixed aryloxy aryl silane we have prepared by adding phenol and p-cresol to dichlorodiphenylsilane, a commercially available compound, in equimolecular parts dropwise with stirring. When addition of the components is completed the mixture is heated up to 340° C. over a period of several hours until evolution of HCl is completed. The transesterified product is then distilled at 173–184° C. at 0.1 mm. of mercury pressure to obtain the mixed phenyl p-cresyl esters of di-phenyl-silane diol.

The mixed composition of phenyl p-cresyl esters of di-phenylsilane diol has been heated for extended periods at 727° F. without decomposition; has an atmospheric boiling point in the range 775–790° F.; and has a refractive index of 1.5975.

The reaction giving this silane is:

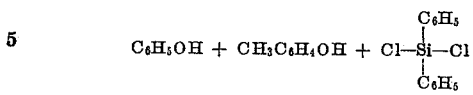

which results in the esters

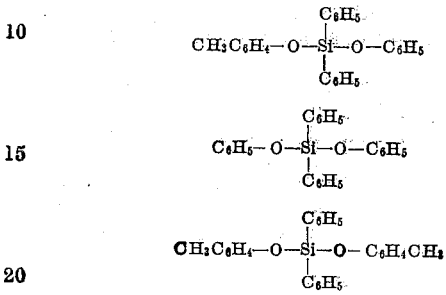

which esters are present in the mixed silane in various proportions.

If commercial cresol or cresylic acid, which includes meta and para cresol, is used in place of cresol in this reaction it follows that more complicated mixed esters compositions are obtained which we have found to have similar high temperature characteristics. These more complicated mixed esters compositions may be identified as mixed phenyl cresyl esters of di-phenylsilane diol and include the following esters in a transesterified composition where R is phenyl, R' is p-cresyl and R'' is m-cresyl radicals.

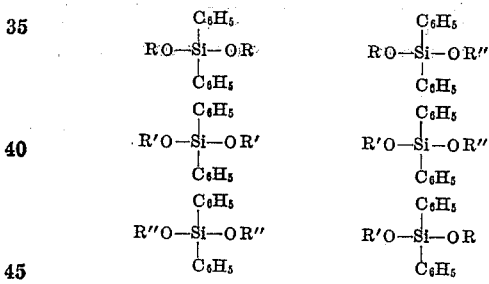

It follows that other aromatic hydroxy compounds such as the xylenols and naphthols may be used in place of cresol to obtain the aryloxy groups and that the mixed di-aryloxy di-phenyl silanes so obtained have similar desirable high temperature characteristics.

We have prepared a mixed triaryloxy monophenyl silane by adding to one mole of monophenyl trichlorosilane, a commercially available product, dropwise with stirring over a period of from one to two hours a 60–40 per cent mixture of phenol and p-cresol. This mixture was then heated with stirring for 24 hours at 150° C. and at the end of this time very little HCl was evolved. The mixture was then distilled at 185–194° C. at 0.05 mm. of mercury pressure giving a clear liquid having a refractive index of 1.5830 and a pour point of −13° C. (+8° F.) with an atmospheric boiling point in the range 780–806° F.

The reaction resulting in this mixed monophenyl triaryloxy silane is:

R—SiCl₃ + R—OH + R'—OH where R is phenyl and R' is p-cresyl. This silane is a mixed ester composition containing the four following different phenyl aryloxy silanes:

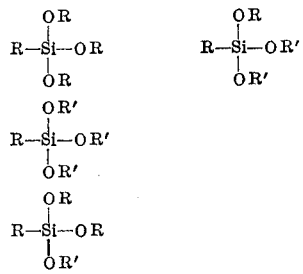

The high temperature characteristics of this silane makes it useful as a high temperature heat transfer medium.

It is now apparent that by the present invention we have provided novel compositions having unusual and desirable high temperature characteristics combined with low melting points which make these liquids ideally suited for the several uses and objects set out above as well as for numerous other uses suggested by their unique physical properties.

It is also apparent that other compositions may now be suggested to those skilled in the art without departing from our inventive concept and reference should therefore be had to the appended claims to determine the scope of our invention.

What is claimed is:

1. A mixture of aryl-triaryloxysilanes obtained by reaction to chemical equilibrium of one mole of aryl-trichlorosilane with a mixture composed of three moles of phenols in equimolecular amounts until liberation of hydrogen chloride is essentially complete.

2. A mixture of diphenyl-diaryloxysilanes obtained by reaction to chemical equilibrium of one mole of diphenyldichlorosilane with a mixture composed of two moles of phenols in equimolecular amounts until liberation of hydrogen chloride is essentially complete.

3. A mixture of diphenyl, di-p-cresyl and phenyl p-cresyl esters of diphenylsilanediol obtained by reaction to chemical equilibrium of one mole of diphenyldichlorosilane with a mixture composed of one mole of phenol and one mole of p-cresol until liberation of hydrogen chloride is essentially complete.

4. A mixture of diphenyl, dicresyl and phenyl cresyl esters of diphenylsilanediol obtained by reaction to chemical equilibrium of one mole of diphenyldichlorosilane with a mixture composed of one mole of phenol and one mole of cresol until liberation of hydrogen chloride is essentially complete.

5. A mixture of diphenyl, dixylenyl and phenyl xylenyl esters of diphenylsilanediol obtained by reaction to chemical equilibrium of one mole of diphenyldichlorosilane with a mixture composed of one mole of phenol and one mole of xylenol until liberation of hydrogen chloride is essentially complete.

6. A mixture of diphenyl, dinaphthyl and phenyl naphthyl esters of diphenylsilanediol obtained by reaction to chemical equilibrium of one mole of diphenyldichlorosilane with a mixture composed of one mole of phenol and one mole of naphthol until liberation of hydrogen chloride is essentially complete.

7. A mixture of phenyl-triaryloxysilanes obtained by reaction to chemical equilibrium of one mole of phenyltrichlorosilane with a mixture composed of three moles of phenols in equimolecular amounts until liberation of hydrogen chloride is essentially complete.

8. A mixture of diaryl-diaryloxysilanes obtained by reaction to chemical equilibrium of one mole of diaryl-dichlorosilane with a mixture composed of two moles of phenols in equimolecular amounts until liberation of hydrogen chloride is essentially complete.

References Cited in the file of this patent

UNITED STATES PATENTS

| Number | Name | Date |
|---|---|---|
| 2,335,012 | Johnson | Nov. 23, 1943 |
| 2,386,793 | Hanford | Oct. 16, 1945 |

OTHER REFERENCES

Kreshkov et al., Chem. Abstracts, vol. 40, col. 1689 (1946). (Abstracted from Zhur. Khim. Prom. No. 8, pages 10–12 (1944)).

Burkhard et al., "Chem. Reviews," Aug. 1947, vol. 41, pages 122, 123.